United States Patent [19]

Puchosic

[11] E Re. 30,893

[45] Reissued Apr. 6, 1982

[54] METHOD OF VACUUM PACKAGING COMPRESSIBLE MATERIALS AND APPARATUS

[75] Inventor: John E. Puchosic, McPherson, Kans.

[73] Assignee: Johns-Manville Corporation, New York, N.Y.

[21] Appl. No.: 973,422

[22] Filed: Dec. 26, 1978

Related U.S. Patent Documents

Reissue of:

[64] Patent No.: 4,016,707
Issued: Apr. 12, 1977
Appl. No.: 663,373
Filed: Mar. 3, 1976

[51] Int. Cl.[3] ..... B65B 1/26
[52] U.S. Cl. ..... 53/436; 53/526
[58] Field of Search ..... 53/436, 434, 449, 512, 53/526

[56] References Cited

U.S. PATENT DOCUMENTS

| | | | |
|---|---|---|---|
| 2,888,788 | 6/1959 | Gebhardt | 53/112 B X |
| 3,307,319 | 3/1967 | Christensen et al. . | |
| 3,429,095 | 2/1969 | Huson | 53/436 X |
| 3,889,444 | 6/1975 | Davis et al. | 53/124 B X |

FOREIGN PATENT DOCUMENTS

| | | |
|---|---|---|
| 666799 | 2/1952 | United Kingdom . |
| 1017164 | 1/1966 | United Kingdom . |
| 1070481 | 6/1967 | United Kingdom . |
| 1147445 | 4/1969 | United Kingdom . |

*Primary Examiner*—Travis S. McGehee
*Attorney, Agent, or Firm*—Robert M. Krone; Joseph J. Kelly; William C. Anderson

[57] ABSTRACT

A method of vacuum packaging compressible material in a sealed flexible fluid impervious container, such as a poly bag, is disclosed. One or more slits are made in the container and air in the container is withdrawn through the slits. This creates a partial vacuum in the container that results in compression of the compressible material. When the desired compression has been obtained, restraining means are placed around the flexible container to maintain the package in a compressed state when the partial vacuum is eventually lost. A novel apparatus for use in this method is also disclosed.

12 Claims, 7 Drawing Figures

Fig. 3.
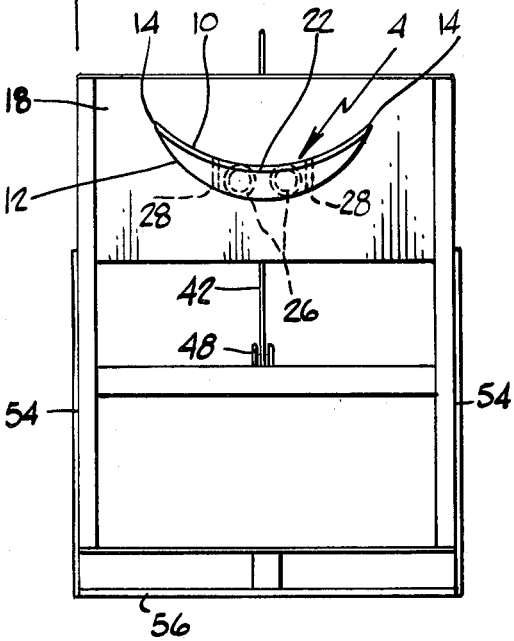
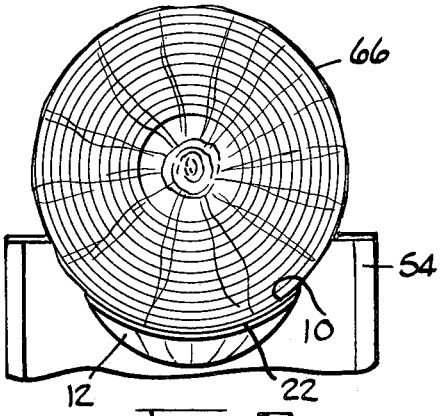
Fig. 6.
Fig. 4.
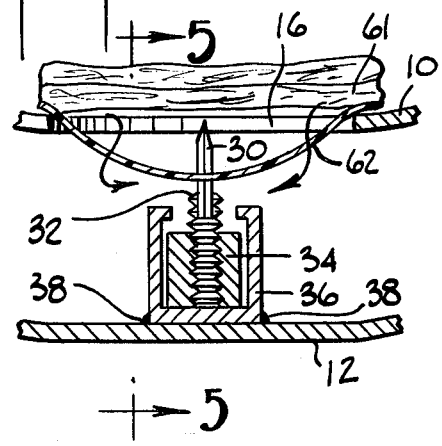
Fig. 5.
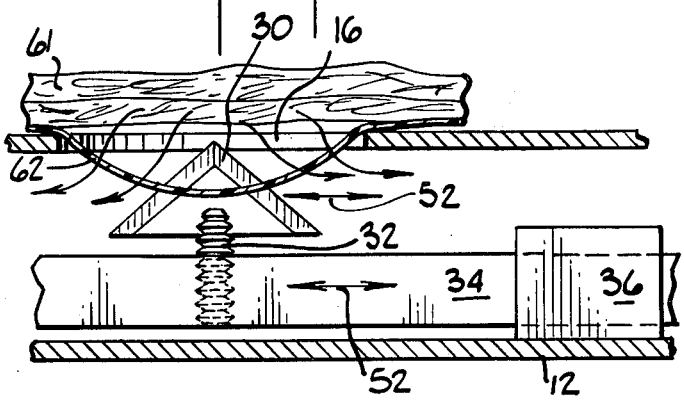
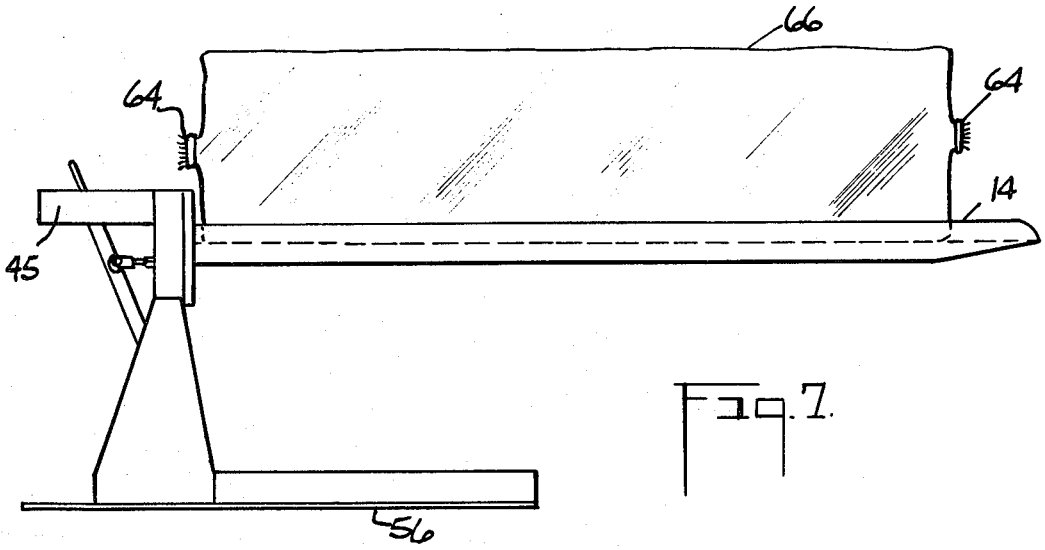
Fig. 7.

METHOD OF VACUUM PACKAGING COMPRESSIBLE MATERIALS AND APPARATUS

Matter enclosed in heavy brackets [ ] appears in the original patent but forms no part of this reissue specification; matter printed in italics indicates the additions made by reissue.

Vacuum packaging of compressible materials to reduce the package size is old. For example, one method and apparatus for practicing the method is disclosed in U.S. Pat. No. 3,889,444. In this patent prior art discussed includes the methods and apparatus disclosed in U.S. Pat. Nos. 3,307,319 and 3,458,966.

In all of these prior art techniques it is necessary to leave one end of the fluid impervious container unfastened or only temporarily fastened until after the package has been compressed, because in all of these techniques a member necessary for drawing the air out of the container to compress the material therein must enter through one end of the container. After the package has been compressed by the withdrawal of much of the air therein, the suction member is withdrawn from the container and only then can that end be permanently fastened. This feature causes inconveniences when packaging especially long packages, e.g. 6–12 feet, or when packaging very short packages, e.g., 3 feet or less.

In the devices disclosed in the prior art only one package can be treated at a time. Thus, when very short packages, such as 3 feet or less, are being produced it takes almost as long to package a short package as it does to package a long package. Meanwhile, the manufacturing line is producing short packages at a much higher rate in number than long packages since the output in terms of pounds of material is about the same whether making long packages or short packages. As a result, the packaging station becomes a bottleneck in the process requiring the use of a plurality of packaging devices and additional people to man them, especially when making short packages.

Also, when making relatively long packages in the range of 6–12 feet, especially 8–12 feet, it is difficult for one man to use those vacuum packaging techniques requiring the package to be suspended around a mandrel suction device, i.e., for the man to place the package onto the mandrel. In order to lift the package he is not in a position to see the end that he is trying to center onto the mandrel. Even when using the technique described in U.S. Pat. No. 3,889,444 on long rolls, the packaging is not completed after the restraining means portion of the package has been applied because it is still necessary to remove the suction device and close one end of the impervious container.

For the above reasons, there is a need for a technique and device that would overcome the problems presented by the prior art techniques and devices.

BRIEF SUMMARY OF THE INVENTION

The present invention provides a method of vacuum packaging a compressible material contained in a fluid impervious container whereby both ends of the container can be closed prior to vacuum packaging, whereby a number of short rolls can be packaged simultaneously, and whereby long rolls can be packaged without difficulty by one person. In the method of the present invention a compressible material is placed inside a flexible fluid impervious container and the container is sealed by any conventional manner. One or more slits are then made in the fluid impervious container material and air in the container is withdrawn through the slits. The withdrawal of the air from the container creates a partial vacuum resulting in compression of the compressible material therein. When the desired compression has been obtained, restraining means are placed around the flexible container to maintain the material in a compressed state when the partial vacuum inside the container is eventually lost.

The present invention also provides an apparatus comprising a tongue means for developing a sealed boundary around a portion of the exterior of the fluid impervious container material when a partial vacuum is developed between the tongue means and the impervious material with the tongue means having at least one opening in a surface adapted to contact the impervious material, a chamber below opening and adapted to the creation of a partial vacuum therein, and means located in the chamber and below the at least one opening for puncturing or slitting the impervious container material when the impervious material is drawn into the opening by the partial vacuum. Preferably the tongue means is sufficiently long to permit several short packages to be drawn down simultaneously, and to permit a long package to be compression packaged by one person. In the preferred embodiment disclosed in the drawings the perforating means is a sharpened blade located below each opening, which blade can be moved back and forth to increase the dimensions of the perforation or slit in the fluid impervious material.

In the method and apparatus of the present invention, compressible material sealed in a fluid impervious bag can be placed on a device for compression packaging, or the device can be suspended from above on a hoist or the like and lowered onto packages laying on the floor for compression packaging. Other orientations are also possible.

BRIEF DESCRIPTION OF THE DRAWINGS

FIG. 3 is an end view of the device shown in FIGS. 1 and 2.

FIGS. 4 and 5 better illustrate a feature of the preferred embodiment shown in FIGS. 1–3.

FIG. 6 is a partial end view of the device shown in FIGS. 1–3 with a package in place.

FIG. 7 is an elevational view of the device shown in FIGS. 1–3 with a long package in place.

DETAILED DESCRIPTION AND PREFERRED EMBODIMENTS

Figure 1:
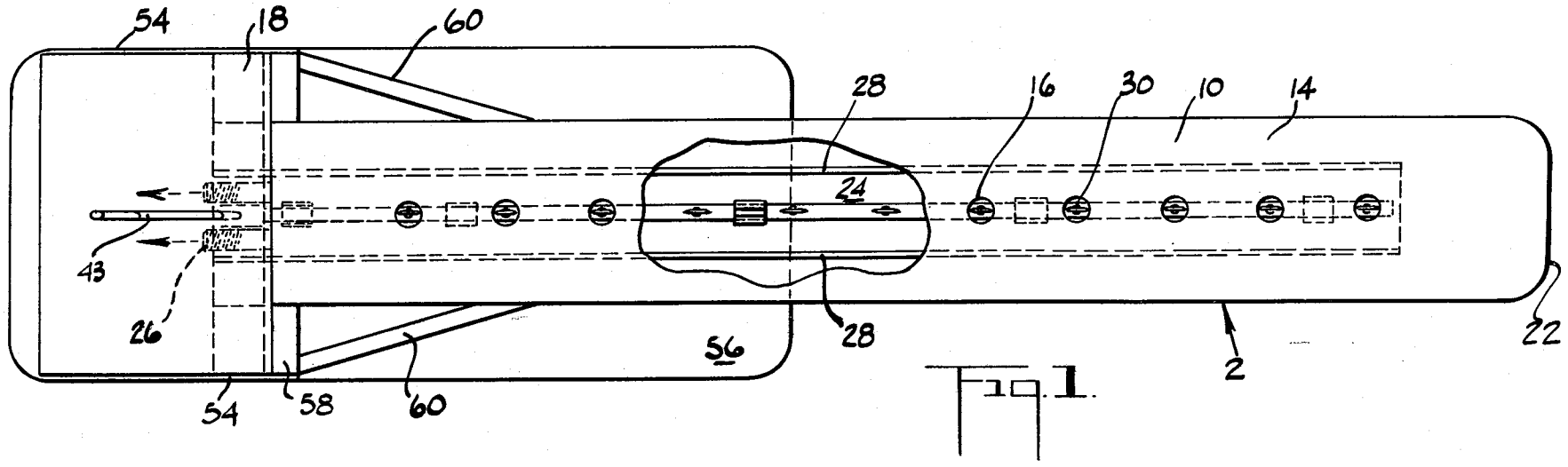
FIG. 1 is a plan view of a preferred embodiment of the present invention with a portion broken away to illustrate a feature of the embodiment.
Figure 2:
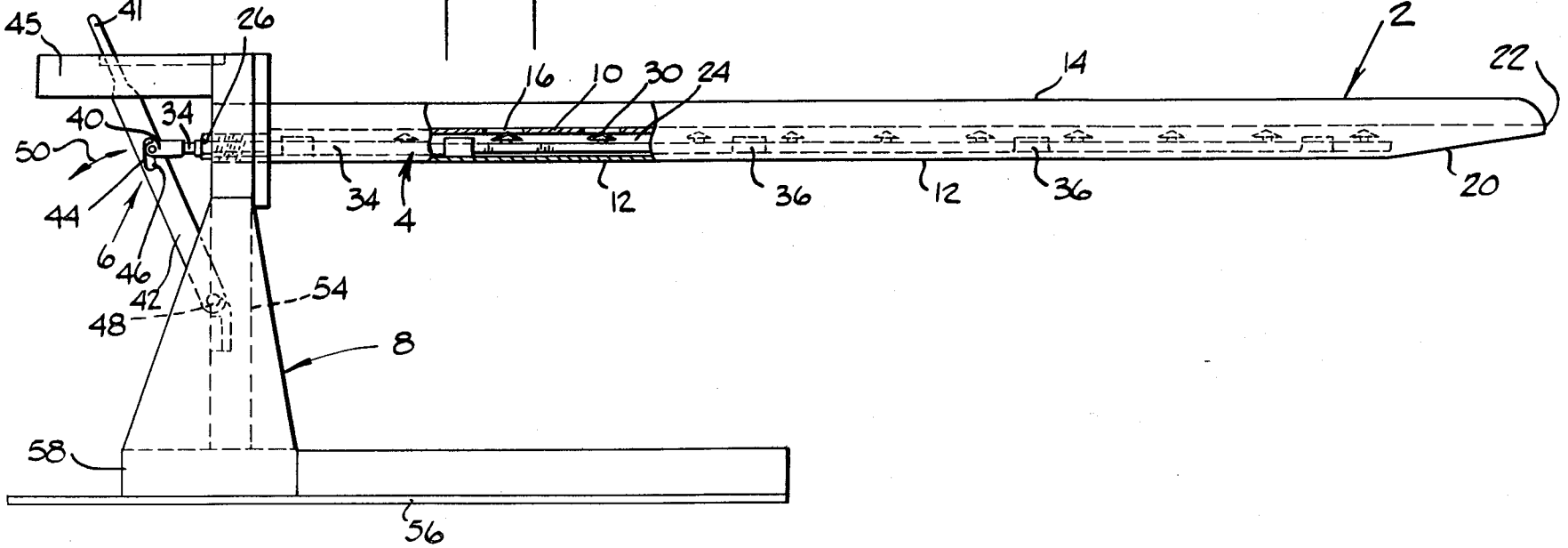
FIG. 2 is an elevational view of the device illustrated in FIG. 1 with a portion broken away to illustrate a feature of the device.

Referring to FIGS. 1–3, a preferred embodiment of the invention comprises a tongue assembly 2, a chamber 4 communicating between the top of the tongue assembly and a vacuum pump, a perforating assembly 6, and a base assembly 8.

The tongue assembly 2 comprises a curved upper plate 10 and a curved lower plate 12. The upper plate 10 and the lower plate 12 are joined at their longitudinal edges 14 by welding or by any other suitable fastening means. A typical curvature for the top surface of the upper plate 10 is a radius of about 9 inches, but any radius is suitable so long as it permits a seal to be formed between the top surface of the upper plate 10 and a fluid impervious container material. The top surface of the upper plate 10 is smooth to enable an air seal to be formed with a flexible impermeable container material. The upper plate 10 contains at least one opening 16, and preferably a plurality of spaced openings 16, along its length. The shape of the opening(s) is not critical. While a circular shape is shown, each opening could be an oval, longitudinal slot, square, diamond, etc.

The tongue assembly 2 is cantilever supported in a frame 18, which in the embodiment illustrated is attached to the base assembly 8. While the tongue assembly can be of any length, it is preferred to have a length at least four times its width dimension and most preferably the length will be sufficient to accommodate a package having a length in the range of 6–12 feet and especially in the range of 8–12 feet or longer.

The lower plate 12 tapers up to the upper plate 10 in an end portion 20 such that tongue assembly 2 has a thickness at its extremity 22 of only about the combined thicknesses of the upper plate 10 and the lower plate 12. The upper plate 10 can be welded to the lower plate 12 along the edge of its extremity 22. The significance of the tapered end portion 20 will become apparent later in the description of how the device is used in the method of the present invention.

Inside the tongue assembly 22 a chamber 24 has been formed by the joining of the edges of the upper plate 10 and the lower plate 12. The chamber 24 communicates with a conventional vacuum pump (not shown) by way one or more outlets 26, a conventional on-off valve (not shown), and conventional hoses (not shown). The conventional on-off valve used to connect the chamber 24 with the vacuum pump through outlets 26 can be of the type that when in the off position permits air to bleed into chamber 24 to eliminate a partial vacuum within the chamber 24. Such valves are conventional in the art for this purpose. Two or more stiffening members 28 are welded to the frame 18 and plug welded to the upper plate 10 and to the lower plate 12 to strengthen the cantilever mounted tongue assembly 2.

In the apparatus of the present invention, perforating means are located beneath each opening 16. The perforating means can be a sharpened blade 30 rigidly fastened in an upright position below each opening 16 so that the uppermost point of the blade rests slightly below the top surface of the upper plate 10. To increase the dimension of the perforations, the blade 30 can be mounted in a movable manner such as by the perforating assembly 6. Each blade 30 is rigidly attached to a support 32, which can be a threaded bolt (see FIGS. 4 and 5). Each of the supports 32 are embedded in a common shaft 34 that runs for most of the length of the tongue assembly 2 and that extends through the frame 18. The shaft 34 is supported and guided in the chamber 24 by guide members 36 located periodically along its length and attached to the top surface of the lower plate 12 by any suitable means, such as by welds 38.

Attached to the end of the shaft 34 protruding through the frame 18 is a clevis 40. The clevis is attached to a lever 42 by a pin 44 extending through a generally vertically elongated slot 46 located in the lever 42 intermediate the two ends of the lever. The lower end of the lever 42 is pivotally attached to the base assembly 8 with a pin 48. When the lever is moved back and forth by a handle 41 in the direction indicated by arrows 50, the shaft 34, and the knives 30 attached thereto, move back and forth in the directions indicated by arrows 52 (FIG. 5). The handle 41 on the end of lever 42 extends through a slot 43 in a horizontal table 45 attached adjacent to the frame 18 on the opposite side of the tongue assembly 2.

In the preferred embodiment illustrated in FIGS. 1–3, the device described thus far is supported by a base assembly 8. A base assembly 8 is used when it is desired to mount the tongue assembly spaced from the floor and with the upper plate 10, containing the holes 16, facing upwardly. The base assembly shown in the illustrated embodiment comprises a vertical plate 54 located on each side of the frame assembly 8 and connected by any suitable means to the frame 18, to a base plate 56 and to a reinforced box base 58. Strengthening members 60 are attached in any suitable manner to the base plate 66 and to the reinforced box base 58. The structure of the base assembly 8 is not critical so long as it supports the tongue assembly 2 and the perforating assembly 6 in a stable manner. It would be within the ordinary skill in the art to modify the structure of the base assembly from that shown in the drawings to accomplish the above described result.

In the method of the present invention, and using the apparatus disclosed in FIGS. 1–5, a compressible material 61, such as a roll of fiber glass blanket insulation, a stack of fiber glass batts, or a bulk quantity of blowing or pouring wool, is placed in a container made from a fluid impervious and flexible material 62, such as 1–2 mil polyethylene, and the container is sealed such as by tightly tying the one or more open ends 64 (FIG. 7). The sealed container 66 of compressible material is then lifted onto the tongue assembly 2 such that the bottom of the container rests on the top surface of the upper plate 10. The valve connecting the chamber 24 with the vacuum pump is turned to the on position which draws air from the chamber 24 and also through the openings 16. Removal of air through the openings 16 (see arrows in FIGS. 4 and 5) tends to pull the flexible fluid impervious container material against the top surface of the upper plate 10 forming a seal and once the seal is formed, the fluid impervious material 62 is pulled through the openings 16 due to the normal air pressure inside the container. As the fluid impervious container material 62 is pulled down through the opening 16, as shown in FIG. 5, it contacts the sharp edged blade 30 causing the blade 30 to perforate the fluid impervious material 62. The handle 41 of the lever 42 can then be moved back and forth in the slot 43 in the direction of the arrows 50 to cause the blades 30 to move back and forth in the direction of the arrows 52. This lengthens the perforation or slits in the fluid impervious container material 62 allowing the air therein to be withdrawn more rapidly through the openings 16 and into the chamber 24.

As the air is removed through the slits in the fluid impervious material the partial vacuum created within the container material along with the compressibility of the product contained therein results in compression of the compressible material by the normal atmospheric pressure pressing against the outside of the fluid impervious container material. When the compressible material has been compressed to the desired degree, which is usually a somewhat greater amount than is desired in the finished package, several alternatives are available to alert the operator for finishing the package or packages. First, if a conventional pressure regulator has been installed in the vacuum lines such that the partial vacuum in the chamber 24 will reach a level only sufficient to compress the compressible material to the desired extent and no more. The regulator can be equipped with a conventional switch to sound an alarm or to activate a light to indicate to the operator that the desired compression has been obtained. In the alternative, a conventional vacuum gauge can be attached to communicate with the chamber 24 and the operator can observe this gauge and turn the conventional valve in the vacuum line to the off position when the desired degree of partial vacuum is obtained that will provide the desired compression.

Once the desired compression has been obtained the operator can apply a conventional restraining means to the outside of the package while the package rests on the tongue assembly 2. Typical conventional restraining means are mult-layered kraft paper tubes, heavy duty polymer tubes, such as 5–6 mil polyethylene tubes or sleeves as disclosed in the references discussed earlier in the specification, or plastic netting such as VEXAR, available from DuPont. Because of the small thickness dimension of the tongue assembly 2 and the fact that the compressible material is compressed to a greater degree than is desired in the final package, the retainer sleeve can be slipped around the outside of the tongue assembly 2 from the end 22 and simultaneously over the package resting on the tongue assembly. The tapered portion 20 of the tongue assembly 2 aids in starting the sleeve over that end of the package adjacent to the end 22 of the tongue assembly 2.

Either before or after the retainer means is in position, the conventional valve in the vacuum line can be moved to a position that will allow outside air to rapidly bleed into the chamber 24 eliminating the partial vacuum therein and permitting the package to be easily slipped off of the tongue assembly 2. When the partial vacuum is lost in the chamber 24, the partial vacuum remaining within the package pulls the flexible fluid impervious material surrounding the slits caused by the knives 30 away from the knives and against the package. This action tends to seal the slits such that only a very slow rate of air flow into the package is experienced, thus the package will remain in its compressed state witout any retaining means long enough to allow the retainer sleeve to be applied to the package later, either while the package remains on the tongue assembly 2, or after the package is removed from the tongue assembly 2 to another area or to another apparatus for applying the retaining means. The fact that the perforations formed by the process and apparatus of the present invention tend to substantially self-sealing is another unique feature of the present invention permitting flexibility in the packaging procedure not heretofore practical with the prior art techniques and apparatus. When several short packages are being drawn down simultaneously on the tongue assembly 2, this feature permits the retaining sleeves to be added first to the package closest to the end 22, and then that package can be removed from the tongue assembly 2 and the restraining means added to the adjacent package, etc.

Having had the benefit of the inventor's disclosure, many modifications will occur to those skilled in the art. For example, as mentioned earlier, the tongue assembly 2 need not be supported in the position shown in the drawings, i.e., with the top surface of the upper plate 10 facing upward, but instead could be supported in any orientation. By using a conventional hoist and counterbalancing weights, the tongue assembly could be inverted and supported from above to be lowered onto a package resting on a floor, table, etc. In this position, once the package was drawn down, and as long as the partial vacuum remained in the chamber 24, the tongue assembly could be raised to also raise the package off of the floor or supporting surface to enable the restraining means to be applied. Also, the tongue assembly could be mounted relatively close to the floor and on edge such that a rounded package could be rolled against the top surface of the upper plate 10 to begin the drawing down procedure. Once the partial vacuum was obtained in the chamber 24 and the package was drawn down, the tongue assembly 2 could be pivoted through conventional supporting means or supporting means of obvious structure to raise the package off the floor or supporting surface sufficiently to apply the retaining means. The latter feature would not be necessary though, because the package could be removed from the tongue and it would retain its compressed state sufficiently long to allow retaining means to be applied elsewhere.

While the tongue assembly shown in the drawings has a curved upper plate 10 this is not critical and is curved only because most of the packages desired to be drawn down by the device have a curved outer surface. Some products packaged in a compressed state have a flat outer surface, for example a stack of insulation batts. When packaging flat products in the process and using the device of the present invention, the upper plate 10 of the tongue assembly 2 should be flat.

When it is desired to apply the restraining means while the packages rest on the tongue assembly 2, it is frequently desirable to treat the edges 14 of the tongue assembly 2 to reduce the friction with the restraining material being slid along these edges. This can be done by spraying a Teflon or other smooth coating onto the edges of the tongue assembly 2 or by applying a slick surfaced tape such as Teflon tape over the edges.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by claimed appended hereto.

What I claim is: [In]

1. In *a* method of packaging a compressible material having a generally cylindrical configuration wherein said compressible material is placed inside a tubular container made from a flexible fluid impervious material, [a partial vacuum is created inside said container by withdrawing air from the container to compress the compressible material inside the container, and] *closing any open ends of said container after said compressible material has been placed therein, creating a seal around a portion of the exterior of said flexible container, making one or more perforations in the flexible fluid impervious material within said sealed area using a puncturing means and creating a partial vacuum in said container by continuously withdrawing air from inside said container through said perforations until said compressible material has been compressed to a diameter less than the size of* a restraining sleeve [is] *to be* applied around said compressed container to maintain the compressible material in a compressed state when said partial vacuum is lost, the improvement comprising:

[closing any open ends of said container after said compressible material has been placed therein, creating a seal around a portion of the exterior of said flexible container, making one or more perforations in the flexible fluid impervious material within said sealed area and withdrawing air from inside the container through said perforations until said compressible material has been compressed to a diameter less than the size of said retaining sleeve,] *discontinuing the withdrawal of air from said container through said perforations, forcing said flexible, fluid impervious material away from said puncturing means and allowing said flexible fluid impervious-material to be pressed against said compressible material in order to substantially self-seal said perforations* and there after applying said restraining sleeve.

2. The method as defined in claim 1 wherein said perforation or perforations are in the form of one or more slits in the fluid impervious container material.

3. A method as defined in claim 1 wherein a plurality of spaced perforations are made generally in line along a major portion of the length of said container.

4. A method as defined in claim 2 wherein a plurality of spaced perforations are made generally in line along a major portion of the length of said container.

[5. A method as defined in claim 1 wherein prior to applying said restraining sleeve, withdrawal of air from said container through said perforations is stopped.]

[6. A method as defined in claim 2 wherein prior to applying said restraining sleeve, withdrawal of air from said container through said perforations is stopped.]

7. An apparatus for use in packaging compressible material in a flexible fluid impervious sealed container comprising:

a. an elongated cantilever mounted tongue means for contacting a portion of the exterior of said container and for developing a sealed boundary around a portion of the exterior of said fluid impervious container when a partial vacuum is developed between said tongue means and said fluid impervious material, said tongue means having at least one opening in a surface adapted for contacting said fluid impervious material.

b. a chamber located below the upper surface of said tongue means, said chamber communicating with the upper surface of said tongue means through said at least one opening and said chamber being connected to means for the creation of a partial vacuum therein, and c. means located in said chamber and beneath said at least one opening in said tongue means for puncturing said fluid impervious material in the vicinity of said at least one opening when said fluid impervious material is drawn into said at least one opening by a partial vacuum in said chamber.

8. A device as defined in claim 7 wherein said tongue means has a length of at least 6 feet.

9. A device as defined in claim [2] *7* wherein said tongue means has a length of at least 8 feet.

10. A device as defined in claim 7 wherein said tongue means has a curved upper surface transverse to the length thereof.

11. A device as defined in claim 7 wherein said tongue means has a plurality of openings spaced along the length thereof.

12. A device as defined in claim 7 wherein said puncturing means is a sharpened blade having a point or leading edge located slightly below the upper surface of said tongue means.

13. A device as defined in claim 12 wherein said blade can be moved back and forth lengthwise of said tongue means to facilitate puncturing or cutting of said fluid impervious container.

14. A device as defined in claim 7 wherein the lower surface of the cantilever mounted tongue means tapers upwards towards the unsupported end of said tongue means.

* * * * *